United States Patent [19]

Flosbach et al.

[11] Patent Number: 4,729,241
[45] Date of Patent: Mar. 8, 1988

[54] MEASURING HEAD FOR VACUUM GAUGE

[75] Inventors: Rudolf Flosbach, Thier-Wipperfürth; Günter Reich, Cologne; Hans-Joachim Schubert, Wesseling, all of Fed. Rep. of Germany

[73] Assignee: Leybold-Heraeus GmbH, Cologne, Fed. Rep. of Germany

[21] Appl. No.: 932,493

[22] Filed: Nov. 20, 1986

[30] Foreign Application Priority Data

Nov. 21, 1985 [DE] Fed. Rep. of Germany ....... 3541178

[51] Int. Cl.⁴ .............................................. G01L 21/12
[52] U.S. Cl. ........................................... 73/755; 73/756
[58] Field of Search ........................ 73/755, 756, 431

[56] References Cited

U.S. PATENT DOCUMENTS

| 2,736,200 | 8/1950 | Kleimack et al. | 73/755 |
| 3,426,597 | 4/1967 | Heijne et al. | 73/755 |
| 3,580,081 | 9/1969 | Greenberg et al. | 73/755 |
| 4,106,350 | 8/1978 | Morris et al. | 73/755 |

FOREIGN PATENT DOCUMENTS

| 1699150 | 3/1954 | Fed. Rep. of Germany . | |
| 2247988 | 9/1972 | Fed. Rep. of Germany . | |
| 0071694 | 1/1982 | Fed. Rep. of Germany . | |
| 0049435 | 5/1965 | Poland | 73/755 |
| 955661 | 8/1959 | United Kingdom . | |

OTHER PUBLICATIONS

Davis, "Rugged Vacuum Gage Using Thin Metallic Films", HDL Bulletin, No. 9, 11 Feb. 1965.
J. Phys. E.: Sci. Instrum., vol. 11, 1978, "A Simple Constant-Resistance Thermistor Pirani Gauge", Alp Önol, pp. 294-295.
The Review of Scientific Instruments, vol. 33, No. 8, "Electroluminescent Pressure Gauge", C. A. Ziegler et al, pp. 812-818, 1962.

Primary Examiner—Donald O. Woodiel
Attorney, Agent, or Firm—Spencer & Frank

[57] ABSTRACT

A measuring head for a vacuum gauge. An essentially cylindrical housing encloses a measuring cell which is sealed in a vacuum tight manner against the surrounding atmosphere and is connectable with an evacuatable cavity. A measuring filament for producing an electrical signal corresponding to the pressure in the measuring cell is disposed in the measuring cell. The measuring filament is disposed approximately perpendicularly to the axial direction of the housing.

22 Claims, 3 Drawing Figures

MEASURING HEAD FOR VACUUM GAUGE

BACKGROUND OF THE INVENTION

The present invention relates to a measuring head for a vacuum gauge operating according to the thermal conduction principle and including an essentially cylindrical housing and a measuring cell disposed therein so as to be sealed in a vacuum tight manner against the surrounding atmosphere and connectable with an evacuatable cavity, with a measuring filament for producing an electrical signal corresponding to the pressure in the measuring cell being disposed in the measuring cell.

A vacuum gauge of this type is disclosed in German Offenlegungsschrift [laid open patent application] No. 2,247,988 and British Pat. No. 955,661. The electrical terminals for the measuring filament are brought out of the measuring cell in an electrically insulated manner and, in the vacuum gauge according to British Pat. No. 955,661, end in the form of plug-in pins onto which suitable sockets can be plugged to connect the measuring filament with a supply and display device. Customarily, further electrical components of this device are accommodated in a Wheatstone bridge into which the measuring filament is connected. The bridge current in an unregulated thermal conduction vacuum gauge, or the bridge voltage in a regulated thermal conduction vacuum gauge, serves as a measure for the gas pressure in the measuring cell.

In the prior art vacuum gauges, the measuring filament is always disposed parallel to the longitudinal axis of the cylindrical housing so that an elongate configuration results. This configuration is desirable since it indicates right away the position in which the measuring filament is installed. This is of particular significance for the user since, due to convection phenomena within the measuring cell, the measuring signal is dependent upon the position in which the measuring filament is installed. Thus, the user must always ascertain the correct position of the measuring filament.

Measuring heads of the prior art type are not very suitable for measuring or monitoring pressures in evacuated cavities in flat components. Such components are, for example, plates or pipes having heat insulating characteristics, which are all given double walls and, in order to improve the insulating effect, are evacuated. If the relatively flat double walls of such components were equipped with the prior art measuring heads, the housings of the measuring heads would project considerably. The use of such components, in particular during transport, assembly, storage and the like, is therefore considerably impeded. Moreover, the measuring heads, and thus their proper function, are endangered by shocks. The installation of pipes equipped with measuring heads of the prior art in the ground for use as long-distance heat conduits would be possible only at considerable expense.

SUMMARY OF THE INVENTION

It is an object of the present invention to provide a measuring head for a vacuum gauge whose structural height is as small as possible and which is better suited for use in flat, evacuated components.

The above and other objects of the invention are accomplished by the provision of a measuring head for a vacuum gauge, wherein the measuring head includes an essentially cylindrical housing; and a measuring cell disposed in the housing and including seal means for sealing the measuring cell in a vacuum tight manner against a surrounding atmosphere, coupling means for coupling the measuring cell with an evacuatable cavity, and a measuring filament disposed in the measuring cell for producing an electrical signal corresponding to a pressure in the measuring cell, the measuring filament being oriented approximately perpendicularly to the axis direction of the housing.

In a measuring head according to the invention, therefore, the measuring filament is arranged approximately perpendicularly to the axis of the housing. This measure permits the construction of extremely flat measuring heads with which double-walled plates or pipes can be equipped to measure and/or monitor the pressure in their evacuated interior spaces without constituting an impediment for these components during use.

Preferably, the height of the substantially cylindrical housing of the measuring head is less than its diameter, preferably less than half its diameter.

According to another advantageous feature of the invention, the opening which serves to connect the measuring cell with the evacuated cavity if equipped with a gas permeable cover. This measure is required particularly if, as is known in connection with thermally insulated components, the evacuated cavity is filled with an insulating material, e.g. sand or other powdered materials. The measuring cell and the measuring filament must then be protected against the penetration of such fill materials. It is also known to compress the filler material under high pressure (e.g. 100 bar). The cover must also be able to withstand such a high pressure.

BRIEF DESCRIPTION OF THE DRAWINGS

Further advantages and details of the invention will be described below with reference to the accompanying drawings, wherein.

DETAILED DESCRIPTION OF THE INVENTION

Figure 1:
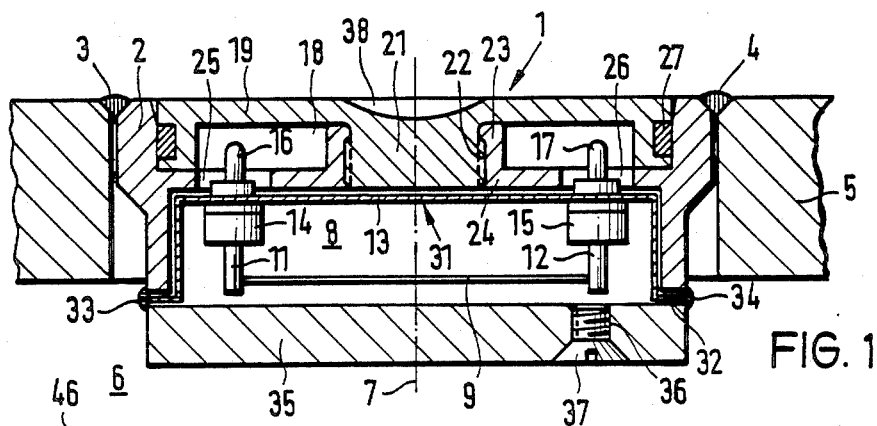
FIG. 1 is a longitudinal sectional view of a measuring head according to one embodiment of the invention.

FIG. 1 is a sectional view of an embodiment of an essentially cylindrical measuring head 1 according to the invention. It comprises an approximately cylindrical housing 2 which is welded at 3 and 4 into a wall 5 which is part of a double-walled component. The area above the illustrated embodiment is the surrounding atmosphere. The area 6 disposed below the measuring head is the interior of a hollow, flat component. The axis of measuring head 1 is marked 7.

Within housing 2 of measuring head 1 there is disposed a measuring cell 8 which includes a measuring filament 9, for example of tungsten. Measuring filament 9 is fastened to connecting pins 11, 12 which are brought out of measuring cell 8 through ceramic bushings 14, 15 in a partition 13 on the atmosphere side of measuring cell 8. Pins 14, 15 end outside of measuring cell 8 in the form of plug-in pins 16, 17, respectively. Instead of plug-in pins 16, 17, plug-in sockets may be used. In this region, there is a flat annular chamber 18 which can be closed by means of a cover 19.

For this purpose, cover 19 is equipped with a central pipe stub 21 having an external thread 22. Associated with pipe stub 21 is a central sleeve 23 having an internal thread. Central sleeve 23 is carried by a base 24 which delimits flat chamber 18 toward partition 13. Base 24 is provided with openings 25, 26 through which plug-in pins 16, 17 project into chamber 18. In order to seal chamber 18 against dust, cover 19 is also provided with a radial seal 27 which, when chamber 18 is closed, rests against the interior of housing 2.

Partition 13 is a component of a cup-shaped structure 31 whose edge 32 is angled and is welded at 33 and 34 to housing 2. A disc 35, composed of, for example, a porous sintered material, is fastened at this weld location to cup 31 to seal the opening of measuring cell 8 toward cavity 6 in which the pressure is to be measured or monitored. Disc 35 is provided with an opening 36 which is closed by a screw 37. Opening 36 serves as test connection immediately after manufacture of measuring head 1. Without such an opening 36, testing would be too time consuming since the porous disc 35 prevents rapid pressure equalization between the interior of measuring cell 8 and cavity 6. The composition of disc 35 is for example sintered stainless steel.

Advisably, cup 31 including partition 13, is composed of an iron-cobalt-nickel alloy sold under the trademark VACON (trademark of Vacüümmscheuelze Hanau), into which ceramic bushing 14, 15 have been soldered. Such a configuration is temperature resistant up to approximately 350° C. Preferably, the coefficient of thermal expansion of partition 13 corresponds to the coefficient of thermal expansion of ceramic bushings 14, 15; breaks, caused by changes of temperature, are avoided by this precaution.

Measuring the pressure within cavity 6 is effected in that cover 19 is unscrewed, for example, by means of a tool introduced into slot 38, and thus chamber 18 is opened. Thereafter, plug pins 16, 17 are freely accessible so that a matching socket arrangement can be plugged in. This allows measuring filament 9 to be connected into a Wheatstone bridge disposed in a measuring and display device (not shown) enabling the pressure in measuring cell 8, which is equal to the pressure in cavity 6, to be measured in the customary manner.

Figure 2:
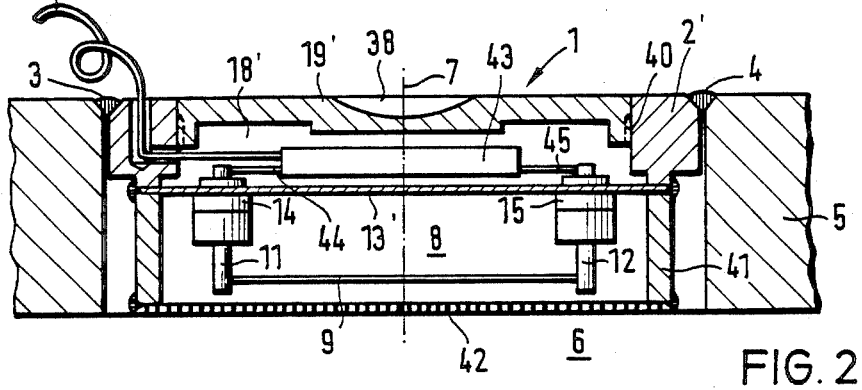
FIG. 2 is a longitudinal sectional view of a measuring head according to another embodiment of the invention.

In the embodiment according to FIG. 2 wherein like components of FIG. 1 are given the same reference numerals, partition 13' is a planar disc and not part of a cup. It is welded inbetween housing member 2' and a likewise essentially cylindrical housing member 41. Toward cavity 6, measuring cell 8 is covered by a tight-mesh grid 42. This grid is connected with housing member 41 by welding or soldering and consists for example of stainless steel.

Cover 19' which closes chamber 18' is equipped with a peripherally disposed thread 40. An associated counterthread is disposed on the interior of housing member 2'.

In contrast to the embodiment according to FIG. 1, electronic components are disposed within chamber 18' of the embodiment according to FIG. 2. These electronic components are shown in a simplified manner as a block 43. Block 43 may contain, for example, the electronic components which, together with measuring filament 9, form a Wheatstone bridge. By way of connecting lines 44, 45, block 43 is electrically connected with plug pins 11 and 12. An electrical signalling line 46 is brought through bores out of chamber 18' and is connected with a central supply and display device (not shown) which is used, for example, to monitor a plurality of measuring locations equipped with measuring heads of the described type.

The embodiment according to FIG. 2 is of advantage in double-walled pipes installed underground whose interior 6 is to be monitored with respect to the pressure maintained therein.

Figure 3:
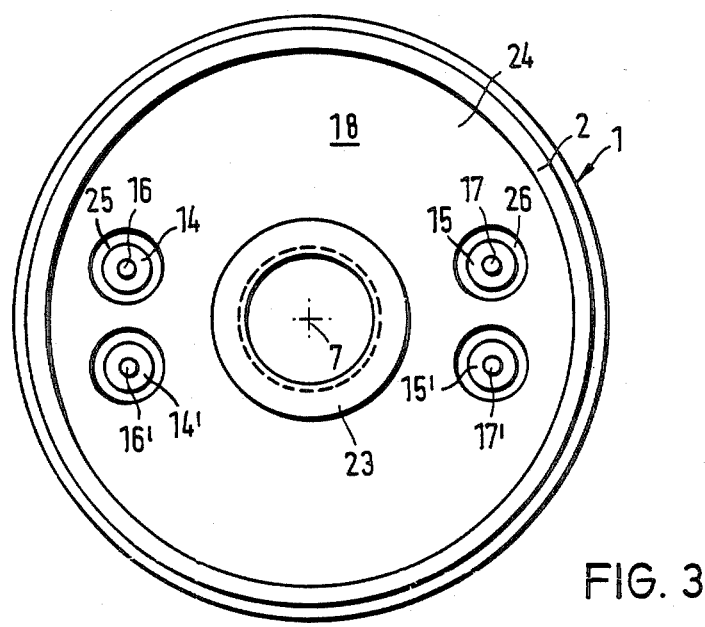
FIG. 3 is a top elevational view of FIG. 1 with the cover removed.

FIG. 3 is a top view of the open chamber 18' of the embodiment according to FIG. 1. A total of four plug pins 16, 17 and 16', 17' and their bushing 14, 15 and 14', 15' are provided. The connecting pins disposed within measuring cell 8 each carry two approximately mutually parallel measuring filaments 9 which can be used selectively for a pressure measurement. Thus, the measuring head remains usable even if one of the two measuring filaments is defective.

The described embodiment relates to a measuring head suitable for a vacuum gauge operating according to the thermal conduction principle. Measuring heads for vacuum gauges operating according to other principles and furnishing electrical signals as their measured values (ionization vacuum gauge, friction vacuum gauge, Penning vacuum gauge and the like) can be used employing the principles of the present invention if the measuring head has suitable dimensions. The important factor is that the diameter of the essentially cylindrical measuring head housing is significantly greater than its height.

The present disclosure relates to the subject matter disclosed in German No. P 35 41 178.3 of Nov. 21, 1985, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. Measuring head for a vacuum gauge, comprising:
    as essentially cylindrical housing; and
    a measuring cell disposed in said housing and including seal means for sealing said measuring cell in a vacuum tight manner against a surrounding atmosphere, coupling means for coupling said measuring cell with an evacuatable cavity, and a measuring filament disposed in said measuring cell for producing an electrical signal corresponding to a pressure in the measuring cell, said measuring filament being oriented approximately perpendicularly to the axial direction of said housing, wherein said coupling means comprises an opening in said measuring cell and a gas permeable cover covering said opening.

2. Measuring head as defined in claim 1, wherein said cylindrical housing has a height which is less than its diameter.

3. Measuring head as defined in claim 2, wherein the height of said cylindrical housing is less than half of its diameter.

4. Measuring head as defined in claim 1, wherein said measuring head is comprised of materials which are temperature resistant up to at least 350° C.

5. Measuring head as defined in claim 1, wherein said cover comprises one of a web or a porous disc.

6. Measuring head as defined in claim 1, wherein said cover is made of one of a sintered material and a ceramic.

7. Measuring head as defined in claim 1, wherein said cover is composed of a porous disc and is provided with a sealable opening.

8. Measuring head as defined by claim 7, and further including a screw for releasable sealing the opening in said cover.

9. Measuring head as defined in claim 1, wherein said cover is configured for withstanding a pressure of at least 100 bar.

10. Measuring head as defined in claim 1, and further including a cup-shaped structure including a component which constitutes a partition for separating said measuring cell from the surrounding atmosphere, and said cover comprises a sintered metal disc.

11. Measuring head for a vacuum gauge, comprising:
an essentially cylindrical housing; and
a measuring cell disposed in said housing and including seal means for sealing said measuring cell in a vacuum tight manner against a surrounding atmosphere, coupling means for coupling said measuring cell with an evacuatable cavity, and a measuring filament disposed in said measuring cell for producing an electrical signal corresponding to a pressure in the measuring cell, said measuring filament being oriented approximately perpendicularly to the axial direction of said housing, wherein said seal means includes a partition separating said measuring cell from the surrounding atmosphere and further including bushings projecting through said partition, said bushings each including one of a current conducting plug-in pin or socket on its side adjacent the surrounding atmosphere.

12. Measuring head as defined in claim 11, wherein said bushings are made of a ceramic material and are soldered into said partition, and said partition is made of an alloy having a coefficient of thermal expansion adapted to the coefficient of thermal expansion of said ceramic material.

13. Measuring head as defined in claim 11, wherein said housing includes two essentially cylindrical housing members, said partition is disposed between said two housing members and is welded to each said housing member; and one of said housing members is adjacent the surrounding atmosphere and defines a flat chamber.

14. Measuring head as defined in claim 13, and further including a cover for sealing said chamber.

15. Measuring head as defined in claim 13, and further including electrical components disposed in said chamber and electrically connected with said measuring filament.

16. Measuring head as defined in claim 11, wherein said cylindrical housing has a height which is less than its diameter.

17. Measuring head as defined in claim 16, wherein the height of said cylindrical housing is less than half of its diameter.

18. Measuring head as defined in claim 11, wherein said measuring head is comprised of materials which are temperature resistant up to at least 350° C.

19. Measuring head for a vacuum gauge, comprising:
an essentially cylindrical housing; and
a measuring cell disposed in said housing and including seal means for sealing said measuring cell in a vacuum tight manner against a surrounding atmosphere, coupling means for coupling said measuring cell with an evacuatable cavity, and a measuring filament disposed in said measuring cell for producing an electrical signal corresponding to a pressure in the measuring cell, said measuring filament being oriented approximately perpendicularly to the axial direction of said housing, wherein two measuring filaments are disposed within said measuring cell, and further including a plurality of bushings communicating with said measuring cell and a plurality of electrical terminals electrically connected with said filaments, each said terminal being brought out of said measuring cell through a respective one of said bushings.

20. Measuring head as defined in claim 19, wherein said cylindrical housing has a height which is less than its diameter.

21. Measuring head as defined in claim 20, wherein the height of said cylindrical housing is less than half of its diameter.

22. Measuring head as defined in claim 19, wherein said measuring head is comprised of materials which are temperature resistant up to at least 350° C.

* * * * *